United States Patent [19]

Simic

[11] 4,247,336

[45] Jan. 27, 1981

[54] CRAZE-RESISTANT PLASTICIZED SULFUR COMPOSITIONS

[75] Inventor: Milutin Simic, Novato, Calif.

[73] Assignee: Chevron Research Company, San Francisco, Calif.

[21] Appl. No.: 13,714

[22] Filed: Feb. 21, 1979

Related U.S. Application Data

[63] Continuation-in-part of Ser. No. 832,854, Sep. 13, 1977, abandoned.

[51] Int. Cl.³ .............................................. C09K 3/00
[52] U.S. Cl. .......................... 106/287.23; 106/287.29; 106/287.32
[58] Field of Search ...................... 106/287.32, 287.29, 106/287.23, 70; 260/125; 252/46.6

[56] References Cited

U.S. PATENT DOCUMENTS

| | | | |
|---|---|---|---|
| 2,084,472 | 6/1937 | Wiezevich | 252/46.6 |
| 3,676,166 | 7/1972 | Louthan | 106/287.32 |
| 4,026,719 | 5/1977 | Simic | 106/287.32 |
| 4,137,187 | 1/1979 | Lowe | 252/46.6 |

*Primary Examiner*—Theodore Morris
*Attorney, Agent, or Firm*—D. A Newell; J. Stoner, Jr.; A. T. Bertolli

[57] ABSTRACT

A composition comprising sulfur, an aromatic polymeric polysulfide sulfur plasticizer, a mica filler, and a triarylphosphate has exceptional craze resistance when used as a coating formulation.

10 Claims, No Drawings

4,247,336

CRAZE-RESISTANT PLASTICIZED SULFUR COMPOSITIONS

CROSS REFERENCE TO RELATED APPLICATION

This application is a continuation-in-part of application Ser. No. 832,854, filed Sept. 13, 1977 now abandoned.

BACKGROUND OF THE INVENTION

The present invention concerns a plasticized-sulfur composition and concentrates useful in its preparation. In particular, the fully formulated composition comprises sulfur, an aromatic polymeric polysulfide sulfur plasticizer, a mica filler and a triarylphosphate. The composition is particularly useful as a coating material because of its surprising resistance to crazing under freeze-thaw cyclic weather conditions.

Plasticized-sulfur compositions are well known in the coating art. Various references disclose and compare the properties of these compositions. For instance, U.S. Pat. No. 3,823,019 describes plasticized-sulfur compositions comprising sulfur, dicyclopentadiene, glass fiber and talc. U.S. Pat. No. 3,290,266 describes plasticized-sulfur compositions comprising sulfur and a polymeric plasticizer. U.S. Pat. No. 4,026,719 describes various plasticized-sulfur compositions. In particular, this patent discloses the use of mica as a filler, which imparts exceptional strength to the compositions.

As the general state of the sulfur and plasticized-sulfur coating art developed, it became clear that these compositions were limited by their tendency to craze or crack when exposed to expansion or contraction stresses. Many coating applications, such as the coating of vessels intended to hold corrosive materials, require an essentially craze-free coating. Thus, in many cases the useful life of the coating is determined by its craze resistance.

SUMMARY OF THE INVENTION

It has been found that the craze resistance of an aromatic polysulfide plasticized-sulfur composition containing mica filler can be significantly enhanced by adding from about 0.5% to about 30%, by weight, of a triarylphosphate based on the fully formulated composition. Concentrates which comprise from about 40% to about 80%, by weight of the triarylphosphate, and an aromatic polymeric polysulfide sulfur plasticizer facilitate formulation of the improved composition.

DETAILED DESCRIPTION OF THE INVENTION

Among other factors, the present invention is based upon the improved properties of an aromatic polymeric polysulfide plasticized-sulfur coating composition which result from the addition of a triarylphosphate to the composition. Accordingly, this invention provides a plasticized-sulfur composition comprising sulfur, an aromatic polymeric polysulfide sulfur plasticizer, a mica filler, and a triarylphosphate. The composition is useful as a coating material in applications such as water impoundment, flooring, embankment consolidation, vessel lining, and the like. In all such applications the craze-resistance of the composition is important. An aromatic polymeric polysulfide plasticized-sulfur composition containing a triarylphosphate and mica as filler has been found to provide significantly improved craze-resistance. Thus, the advantages of the composition of this invention over previously proposed compositions can be readily appreciated.

The concentrations of the various ingredients which make up the fully formulated composition may vary over a broad range. However, for general guidance, best results have been observed where the fully formulated composition comprises from about 50% to about 98% sulfur, from about 0.1% to about 30% aromatic polymeric polysulfide sulfur plasticizer, from about 1% to 40% mica filler, and from about 0.5% to about 30% triarylphosphate (all percent concentrations used to describe the invention, unless otherwise stated, are in weight percent based upon total weight of sulfur, plasticizer, filler and triarylphosphate in the composition).

Sulfur is the major ingredient of the composition. When fully formulated, the composition will typically comprise at least 50% sulfur, preferably from about 60% to about 95%, and most preferably from about 70% to about 90%. The sulfur may be present in the composition as an element of the sulfur plasticizer, but normally the other ingredients of the composition are added to molten elemental sulfur to form a sulfur-based formulation.

When fully formulated, the inventive composition will typically comprise at least 0.1% aromatic polymeric polysulfide plasticizer, preferably from about 0.5% to about 25%, and most preferably from about 1% to about 5%. Sulfur plasticizers, including the aromatic polymeric polysulfide herein contemplated, are well known materials. The term is generally used to describe materials which combine with sulfur and lower its melting point. Plasticized sulfur therefore requires a longer time to crystallize than molten elemental sulfur. The rate of crystallization can be measured by melting a fixed amount of the material on a microscopic slide at 130° C., maintaining the sample at about 78° C. using a surface pyrometer to determine temperature, seeding a corner of the sample with a crystal of the material, and recording the time requied for complete crystallization of the sample. Accordingly, as used herein and in conventional use, the sulfur plasticizer herein specified contemplates materials which, when added to molten elemental sulfur, increase the crystallization time in reference to the elemental sulfur itself.

The aromatic polymeric polysulfide plasticizers are well known in the plasticized-sulfur art as shown, for example, in U.S. Pat. No. 4,026,719. They can be formed by reacting one mol of an aromatic carbocyclic or a heterocyclic compound, substituted by at least one functional group of the class —OH or —NHR in which R is H or lower alkyl, with at least two mols of sulfur.

Suitable aromatic compounds of this type include: phenol, aniline, N-methyl aniline, 3-hydroxythiophene, 4-hydroxypyridine, p-aminophenol, hydroquinone, resorcinol, meta-cresol, thymol, 4,4'-dihydroxybiphenyl, 2,2-di(p-hydroxyphenol)propane, di(p-hydroxyphenyl)methane, etc., p-phenylenediamine, methylene dianiline. Phenol is an especially preferred aromatic compound to form the aromatic polysulfide phenol-sulfur adduct.

The aromatic polysulfides are generally prepared by heating sulfur and the aromatic compound at a temperature in the range of 120° to 170° C. for 1 to 12 hours, usually in the presence of a base catalyst such as sodium hydroxide. (See, for example, Angew, Chem. V. 70, No. 12, pp. 351–67 [1958]). The polysulfide product made in this way has a mol ratio of aromatic compound to sulfur of from 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately, or it may be cooled and stored for future use.

The third ingredient of the composition of the invention is mica filler. The term "mica" as used herein means a layered silicate having an x-ray diffraction pattern tern d spacing of about 9.6 to 10.1 Angstroms, preferably a d spacing of about 9.9 to 10.1 Angstroms. Talc material also is a layered silicate, but has a d spacing of about 9.35 Angstroms.

Preferred micas for use in the composition of the present invention are phlogopite, muscovite, zinnwaldite and biotite, which are natural micas, and fluorophlogopite and barium disilicic, which are synthetic micas. Particularly preferred micas for use in the present invention contain potassium and have a chemical composition of $3Al_2O_3.K_2O.6SiO_2.2H_2O$, also written $K_2Al_4(Al_2Si_6O_{20})(OH)_4$, and sold by U.S. Gypsum under the designation P-80-F. U.S. Pat. No. 4,026,719 describes mica fillers useful in the composition of this invention.

As indicated in the previous description of the composition of this invention, a fourth ingredient is a triarylphosphate. In general, the fully formulated composition will comprise at least 0.5% triarylphosphate, preferably from about 0.7% to about 25%, and most preferably from about 1% to about 5%. The triarylphosphates have some plasticizing properties, but for purposes of this description, they are distinguished from the aromatic polysulfide sulfur plasticizer which is an ingredient of the composition. Thus, the total concentration of triarylphosphate in the fully formulated composition may exceed 30%, if the amount of aromatic polysulfide is less than 30%. Suitable triarylphosphates include, for example, phosphates having from 6 to about 12 carbon atoms in each aryl substituent. The aryl substituents can be similar or dissimilar and may have a condensed or fused ring system. Accordingly, preferred triarylphosphates have the structure

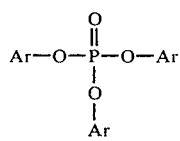

wherein Ar is an aryl group containing from 6 to about 12 carbon atoms, optionally substituted with from 1 to 5 halogen atoms, preferably chlorine. The three Ar groups may be the same or different. Specific suitable aryl group include, for example, phenyl, benzyl, naphthyl, tolyl, xylyl, mixed ethyl phenyls, 4-t-butylphenyl, pentachlorophenyl, 3-bromophenyl, p-phenylphenyl, 2-methyl-1-naphthyl, and the like. Aryls which are substituted by alkyl groups containing more than one carbon atom, i.e., alkylaryls, while suitable are less preferred since they may liberate $H_2S$ or $CS_2$ during formulation. Triphenylphosphate and tribenzylphosphate are the preferred triarylphosphates.

Aryl phosphates are made by the reaction of the phenol with phosphorus oxychloride:

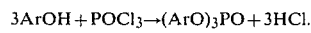

In addition to the four essential ingredients described above, the composition of this invention may optionally comprise various other adjuvants such as pigments, stabilizers, aggregates including sand, gravel, or rock, and the like. Particularly where aggregate is included, the adjuvants may be present in amounts up to as much as 90%, by weight of the total composition.

The composition of this invention can be prepared in molten form by mixing the ingredients at a temperature above the melting point of the composition to produce a homogeneous mixture. For most embodiments, a temperature between about 110° C. and 180° C., preferably between about 125° C. and 150° C., is sufficient. However, for most applications, the composition is prepared from a concentrate comprising the sulfur plasticizer and the triarylphosphate. In addition, the concentrate may contain the mica filler or a fraction of the filler and/or a fraction of the sulfur present in the fully formulated composition. Thus, this invention contemplates a concentrate which when diluted by the addition of sulfur and mica filler provides a fully formulated plasticized-sulfur coating composition. The relative concentration of the plasticizer and triarylphosphate in the concentrate will depend upon the desired relative concentration in the fully formulated composition. A concentrate comprising the sulfur plasticizer and the triarylphosphate in a weight ratio of plasticizer to phosphate of from about 3:1 to about 1:3 is satisfactory for most applications.

The most practical method of preparing the composition of this invention from a concentrate is to add the concentrate and additional filler as well as any other optional adjuvant to molten sulfur at a temperature above the melting point of the composition. The order of addition is not critical, although for thorough mixing aggregate, if used, should be added a fraction at a time or continuously during the entire formulation process.

The fully formulated composition is usually applied in molten form by, for example, spraying or painting a coat onto the surface to be covered. For most surfaces, an 0.30-cm to 0.65-cm uniform coat will provide complete coverage.

EXAMPLES

Summarized in Table I below are Examples 1–17. Listed in Table I are compositions prepared in accordance with the present invention, as well as compositions prepared using other fillers than mica and other plasticizers than the aromatic polymeric polysulfide sulfur plasticizers contemplated by the present invention.

The compositions were prepared by mixing and heating the indicated ingredients in a reaction vessel at a temperature in the range of about 130° C. to 150° C. for a period of one hour. Then the contents of the vessel were poured onto the surface of three 15 × 10 cm concrete bricks in a layer 0.65 cm thick. The coated bricks were tested on a 24-hour temperature cycle involving alternate heating for 8 hours in an oven at 70° C. and then cooled outdoors overnight for 16 hours at ambient temperatures (average 5° C.). Each morning, the surface was examined using a 7-power, lighted magnifying glass. It was regarded as having failed if any crack could be observed sufficiently distinctly that the gap between the two surfaces was undeniable (cracking). Fine cracks could barely be distinguished by the naked eye upon knowing where to look (crazing). The brick was also regarded as having failed if a gap at least 0.5 mm wide appeared between the sulfur and the concrete along at least one entire side, so that it was visually apparent that a substantial portion of the sulfur was no longer in contact with the concrete (delamination).

TABLE I

| | | COMPOSITION, % | | | | CYCLING TESTS | |
|---|---|---|---|---|---|---|---|
| Ex. No. | Sulfur | Plasticizer &/or Triaryl phosphate | | Filler | | Cycles to Failure | Reason |
| 1 | 82 | PSA[1] | 2 | Mica[2] | 16 | 2,2,2 | Crazing |
| 2 | 82 | TPP[3] | 2 | Mica[2] | 16 | 1,1,1 | Cracking |
| 3 | 79.5 | PSA TPP | 2 0.5 | Mica | 18 | 42,42, 42 | Crazing |
| 4 | 79 | PSA TPP | 2 1 | Mica | 18 | 159,165, 177 | Crazing |
| 5 | 79 | PSA TCP[4] | 2 1 | Mica | 18 | 177,178[5], 178[5] | Crazing |
| 6 | 79.5 | PSA BPDPP[6] | 2 0.5 | Mica | 18 | 4,4,4 | Crazing |
| 7 | 79 | PSA BPDPP | 2 1 | Mica | 18 | 178[5],178[5], 178[5] | — |
| 8 | 86 | DCP[7] | 2 | Mica | 12 | 1,1,1 | Delamination |
| 9 | 83 | DCP TPP | 2 1 | Mica | 14 | 4,4,4 | Cracking |
| 10 | 82 | COD[8] | 2 | Mica | 16 | 3,7,7 | Cracking & Delamination |
| 11 | 79 | COD TPP | 2 1 | Mica | 18 | 7,7,7 | Delamination |
| 12 | 84 | LP-3[9] | 2 | Mica | 14 | 11,11,11 | Crazing |
| 13 | 79 | LP-3[9] TPP | 2 1 | Mica | 18 | 7,11,14 | Crazing |
| 14 | 85 | PSA TPP | 2 1 | Talc[10] | 12 | 14,14,43 | Crazing |
| 15 | 80 | PSA TPP | 2 1 | Al Silicate[11] | 17 | 0,0,0 | Cracking |
| 16 | 80 | PSA TPP | 2 1 | Ca sulfate hexahydrate | 17 | 10,1,1 | Crazing |
| 17 | 80 | PSA TPP | 2 1 | Ca carbonate | 17 | 0,0,0 | Crazing |

[1]PSA = phenol sulfur adduct
[2]Mica = P-80-F
[3]TPP = Triphenylphosphate
[4]TCP = Tricresylphosphate
[5]178 = Test still continuing — no failure at 178 cycles
[6]BPDPP = Tertiary butylphenyldiphenylphosphate
[7]DCP = Dicyclopentadiene
[8]COD = 1,5-Cyclooctadiene
[9]LP-3 = Aliphatic polysulfide sold by Thiokol Chem. Co.
[10]Talc = Mistron Vapor Talc sold by United Sierra Co.
[11]Aluminum silicate = Hydrite R sold by Georgia Kaolin Co.

As will be seen from Table I, the presence of all four ingredients as herein specified is required to effect a substantial improvement in enhancing the craze resistance. Thus, in Example 1, where the triarylphosphate was omitted, the resulting composition gave poor results in the cycling test. Similarly, in Example 2, where the aromatic polymeric polysulfide sulfur plasticizer was omitted, the results were poor. On the other hand, substantial improvement in crazing resistance is shown by Examples 3, 4 and 5, where mica, triphenylphosphate and the phenol-sulfur adduct were all present in the compositions. Examples 14-17 show that mica is superior to other fillers. That the aromatic polymeric polysulfide is also unique as compared with other sulfur plasticizers is shown by Examples 9-13.

EXAMPLE 18

A plasticized-sulfur coating composition was prepared by heating and mixing 79% sulfur, 2% phenol-sulfur adduct (PSA), 18% mica and 1% triphenylphosphate at a temperature of about 130° C. The resulting composition was applied to a 3-meter by 1.8-meter T-shaped mortarless cinderbrick wall. The composition was thixotropic and did not sag or drip during application.

The composition had a flexural strength of 127 kg/cm$^2$, a tensile strength of 74 kg/cm$^2$ and compressive strength of 232 kg/cm$^2$. This composition was also evaluated for craze resistance under cycling-temperature conditions. The results are given in Table II as Example 19.

Table II below lists Examples 19 and 20. As stated, Example 19 gives the craze-resistance results of the composition of Example 18. Example 20 gives the craze-resistance results of a composition prepared by mixing and heating at 130° C. 79% sulfur, 2% phenol-sulfur adduct, 18% mica, plus, in addition, a linear aliphatic polysulfide plasticizer.

TABLE II

| | Plasticizer | | Test I, Cycles[3] | | Test II, Cycles[4] | |
|---|---|---|---|---|---|---|
| Ex. No. | &/or Triarylphosphate, % | | Failure | No Failure | Failure | No Failure |
| 19 | TPP[2] | 1 | 159,165, 177 | | | 100 |
| 20 | LP-3[1] | 1 | 60 | | 6 | |

[1]LP-3 is a linear aliphatic polysulfide plasticizer
[2]Triphenylphosphate
[3]One cycle equals 8 hours at 70° C. & 16 hours at about 5° C.
[4]One cycle equals 8 hours at 70° C. & 16 hours at 0° C.

Example 20, a pior art, good non-crazing composition without a triarylphosphate, resisted crazing for 60 cycles in Test I and for 6 cycles in Test II, whereas 3 samples of a comparative composition containing triphenylphosphate, Example 19, did not craze until 159, 165 and 177 cycles (Test I), and showed no failure after 100 cycles (Test II).

Compositions containing different aliphatic phosphates and subjected to Test I of Table II failed after 7 to 9 cycles.

What is claimed is:

1. A plasticized sulfur composition resistant to crazing comprising (1) at least 50% sulfur, (2) at least 0.1% aromatic polymeric sulfide sulfur plasticizer formed by reacting at least two mols of sulfur with one mol of an aromatic carbocylic or heterocyclic compound substituted by at least one functional group of the class —OH or —NHR in which R is hydrogen or a lower alkyl group, (3) mica filler, and (4) at least 0.5% triarylphosphate.

2. A composition according to claim 1 comprising from about 50% to about 98% sulfur, from about 0.1% to about 80% aromatic polymeric polysulfide sulfur plasticizer, from about 1% to about 40% mica filler, and from about 0.5% to about 30% triarylphosphate.

3. A composition according to claim 2 comprising from about 60% to about 95% sulfur, from about 0.5% to about 25% aromatic polymeric polysulfide sulfur plasticizer, from about 5% to about 30% mica filler, and from about 0.7% to about 25% triarylphosphate.

4. A composition according to claim 3 comprising from about 70% to about 90% sulfur, from about 1% to about 5% aromatic polymeric polysulfide sulfur plasticizer, from about 10% to about 20% mica filler, and from about 1% to about 5% triarylphosphate.

5. A composition according to claim 1 wherein said triarylphosphate contains from 6 to about 12 carbon atoms in each aryl substituent.

6. A composition according to claim 1 wherein the sulfur plasticizer is phenol-sulfur adduct formed by reacting at least 2 mols of sulfur per mol of phenol and the triarylphosphate is triphenylphosphate.

7. A composition according to claim 6 comprising about 79% sulfur, about 2% phenol-sulfur adduct, about 18% mica, and about 1% triphenylphosphate.

8. The method of enhancing the craze resistance of a plasticized sulfur composition which comprises incorporating in said composiition at least 0.5% of a triarylphosphate, said composition in addition to said triarylphosphate containing at least (1) 50% sulfur, (2) 0.1% of an aromatic polymeric polysulfide sulfur plasticizer formed by reacting at least 2 mols of sulfur with 1 mol of an aromatic carbocyclic or heterocyclic compound substituted by at least one functional group of the class —OH or —NHR in which R is hydrogen or a lower alkyl group, and (3) 1% mica filler, the specified percentages being by weight based on the total weight of the named ingredients.

9. The method of enhancing the craze resistance of a plasticized sulfur composition which comprises incorporating in said composition 0.5 to 30% of a triarylphosphate, said composition in addition to said triarylphosphate containing (1) 50% to 98% sulfur, (2) 0.1 to 30% of an aromatic polymeric polysulfide sulfur plasticizer formed by reacting at least 2 mols of sulfur with 1 mol of an aromatic carbocyclic or heterocyclic compound substituted by at least one functional group of the class —OH or —NHR in which R is hydrogen or a lower alkyl group, and (3) 1% to 30% mica filler, the specified percentages being by weight based on the total weight of the named ingredients.

10. The method of enhancing the craze resistance of a plasticized sulfur composition which comprises incorporating in said composition at least 0.5% triarylphosphate, said composition in addition to said triarylphosphate containing at least (1) 50% sulfur, (2) 0.1 phenol-sulfur adduct sulfur plasticizer formed by reacting at least 2 mols of sulfur with 1 mol of phenol, and (3) 1% mica filler, the specified percentages being by weight based on the total weight of the named ingredients.

* * * * *